(12) United States Patent
Berkovich et al.

(10) Patent No.: US 7,233,546 B2
(45) Date of Patent: Jun. 19, 2007

(54) FLASH EVENT DETECTION WITH ACOUSTIC VERIFICATION

(75) Inventors: Erez Berkovich, Kfar Bialik (IL); Ofer Solomon, Maalot (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 0 days.

(21) Appl. No.: 11/347,220

(22) Filed: Feb. 6, 2006

(65) Prior Publication Data

US 2006/0239120 A1   Oct. 26, 2006

(30) Foreign Application Priority Data

Feb. 7, 2005   (IL) .................................. 166708

(51) Int. Cl.
*G01S 11/12* (2006.01)
(52) U.S. Cl. ...................................... 367/128
(58) Field of Classification Search ............... 367/128, 367/906
See application file for complete search history.

(56) References Cited

U.S. PATENT DOCUMENTS

| 4,138,660 A | 2/1979 | Hill |
| 5,970,024 A | 10/1999 | Smith |
| 6,215,731 B1 | 4/2001 | Smith |
| 6,621,764 B1 | 9/2003 | Smith |

FOREIGN PATENT DOCUMENTS

EP   1688760 A1 *   8/2006

* cited by examiner

*Primary Examiner*—Dan Pihulic
(74) *Attorney, Agent, or Firm*—Mark M. Friedman

(57) ABSTRACT

A system for identifying flash events including an optical imaging module with one or more optical imaging array, the optical imaging module configured for monitoring a region of interest to identify a tentative flash event. The system further includes a ranging module associated with the optical imaging module and configured to derive an estimated range to a location of the tentative flash event, and an acoustic verification module associated with the ranging module and with one or more acoustic sensor. The acoustic verification module is configured to determine whether an acoustic event corresponding to the tentative flash event is detected within a time window derived from the estimated range, thereby classifying the tentative flash event as either a verified flash event or a rejected flash event.

12 Claims, 4 Drawing Sheets

FLASH EVENT DETECTION WITH ACOUSTIC VERIFICATION

FIELD AND BACKGROUND OF THE INVENTION

The present invention relates to flash event detection and, in particular, it concerns a flash detection system and method combining optical image sensing, range finding and acoustic sensing to reduce false alarm rates.

It is known to employ both optical and acoustic sensor systems, alone or in combination, to identify flash events. Examples of systems combining both optical and acoustic sensors may be found in U.S. Pat. Nos. 5,970,024, 6,215,731 and 6,621,764, all to Thomas Smith.

The principle mode of operation described by Smith in the aforementioned patents is the use of a microphone array to determine an initial estimate of the direction of an event. A gimbaled image sensor is then directed towards this direction and the location is verified optically during subsequent shots. Alternatively, plural optical sensors may provide a panoramic field of view and the detection results of the optical and acoustic systems are correlated to increase accuracy.

The aforementioned functionality described by Smith are reasonably effective under conditions of repetitive fire, but are unable to reliably detect the "first shot". Furthermore, without any capability of determining the range of the flash event, it is impossible to reliably correlate data from the optical and acoustic subsystems so that one subsystem will verify the output of the other subsystem.

There is therefore a need for a flash event detection system and method which would determine an estimated range of an optically-detected tentative flash event so as to allow prediction of an expected time or arrival of a corresponding acoustic event, thereby allowing acoustic verification of an optical flash event even for a single shot.

SUMMARY OF THE INVENTION

The present invention is flash detection system and method combining optical image sensing, range finding and acoustic sensing.

According to the teachings of the present invention there is provided, a system for identifying flash events comprising: (a) an optical imaging module including at least one optical imaging array, the optical imaging module being configured for monitoring a region of interest to identify a tentative flash event; (b) a ranging module associated with the optical imaging module and configured to derive an estimated range to a location of the tentative flash event; and (c) an acoustic verification module associated with the ranging module and including at least one acoustic sensor, the acoustic verification module being configured to determine whether an acoustic event corresponding to the tentative flash event is detected within a time window derived from the estimated range, thereby classifying the tentative flash event as either a verified flash event or a rejected flash event.

According to a further feature of the present invention, the at least one optical imaging array includes a FLIR sensor.

According to a further feature of the present invention, the optical imaging module includes a plurality of optical imaging arrays deployed to monitor a region greater than a field of view of each individual one of the optical imaging arrays.

According to a further feature of the present invention, the ranging module includes a gimbaled ranging sensor.

According to a further feature of the present invention, the optical imaging module includes a plurality of optical imaging arrays with overlapping fields of view, the ranging module including an image processing subsystem for co-processing images from the plurality of optical imaging arrays to derive the estimated range.

According to a further feature of the present invention, the ranging module includes: (a) a data storage device including at least one reference image relating to the region of interest; and (b) an image processing subsystem for co-processing an image from the optical imaging array and the at least one reference image to derive the estimated range.

There is also provided according to the teachings of the present invention, a method for identifying flash events comprising the steps of: (a) employing at least one optical imaging array to monitor a region of interest to identify a tentative flash event; (b) deriving an estimated range to a location of the tentative flash event; (c) defining, based upon the estimated range, an expected time of arrival window for an acoustic event corresponding to the tentative flash event; (d) using at least one acoustic sensor to monitor for an acoustic event corresponding to the tentative flash event within the expected time of arrival window; and (e) if an acoustic event is detected within the expected time of arrival window, classifying the tentative flash event as a verified flash event.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a flash detection system and method combining optical image sensing, range finding and acoustic sensing.

The principles and operation of systems and methods according to the present invention may be better understood with reference to the drawings and the accompanying description.

Figure 1:
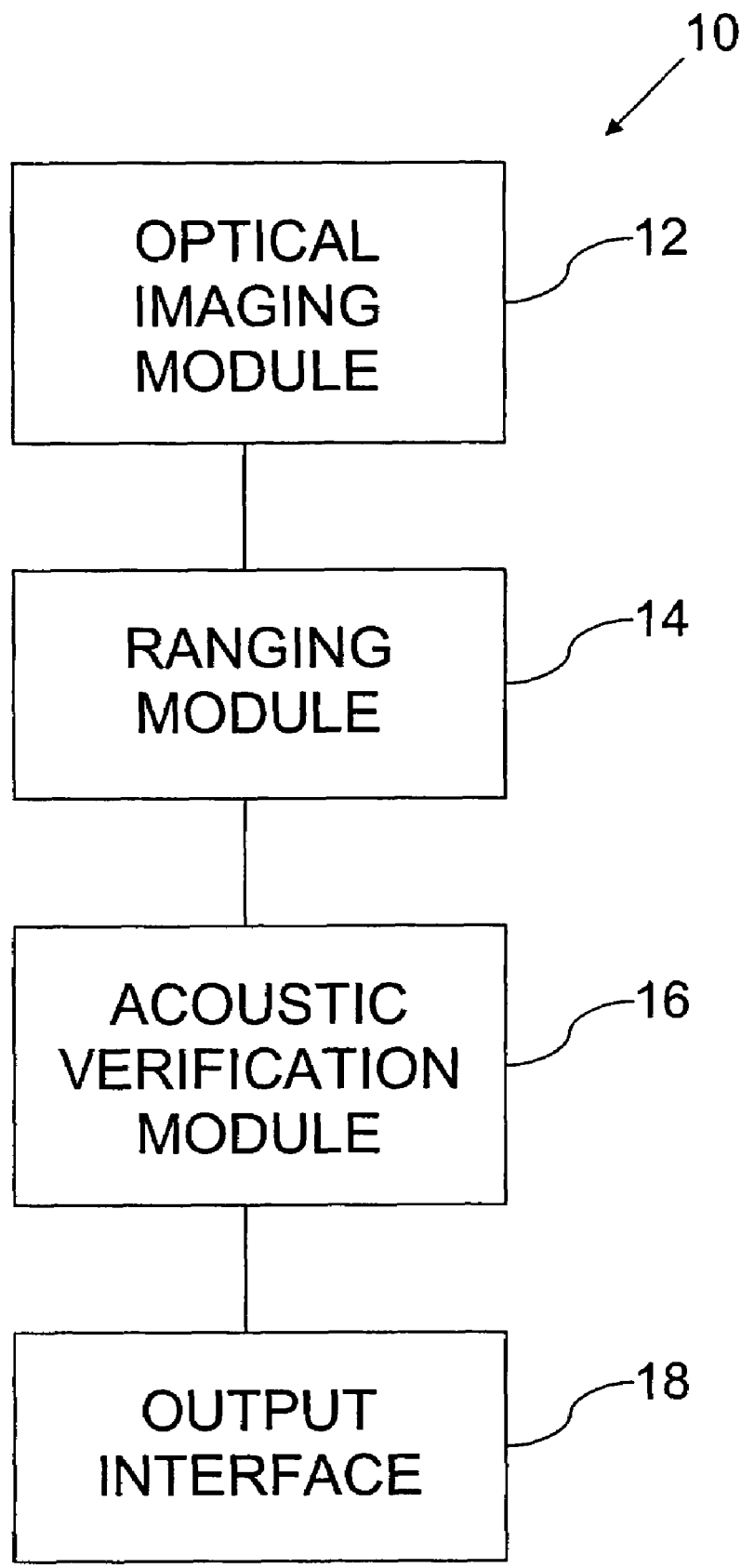
FIG. 1 is a schematic illustration of a system, constructed and operative according to the teachings of the present invention, for identifying flash events.

Referring now to the drawings, FIG. 1 shows schematically a system, generally designated 10, for identifying flash events. In general terms, system 10 includes an optical imaging module 12 configured for monitoring a region of interest to identify a tentative flash event, a ranging module 14 configured to derive an estimated range to a location of the tentative flash event, and an acoustic verification module 16 configured to determine whether an acoustic event corresponding to the tentative flash event is detected within a time window derived from the estimated range, thereby classifying the tentative flash event as either a verified flash event or a rejected flash event. The results from acoustic verification module 16 typically pass to an output interface 18.

Figure 2:
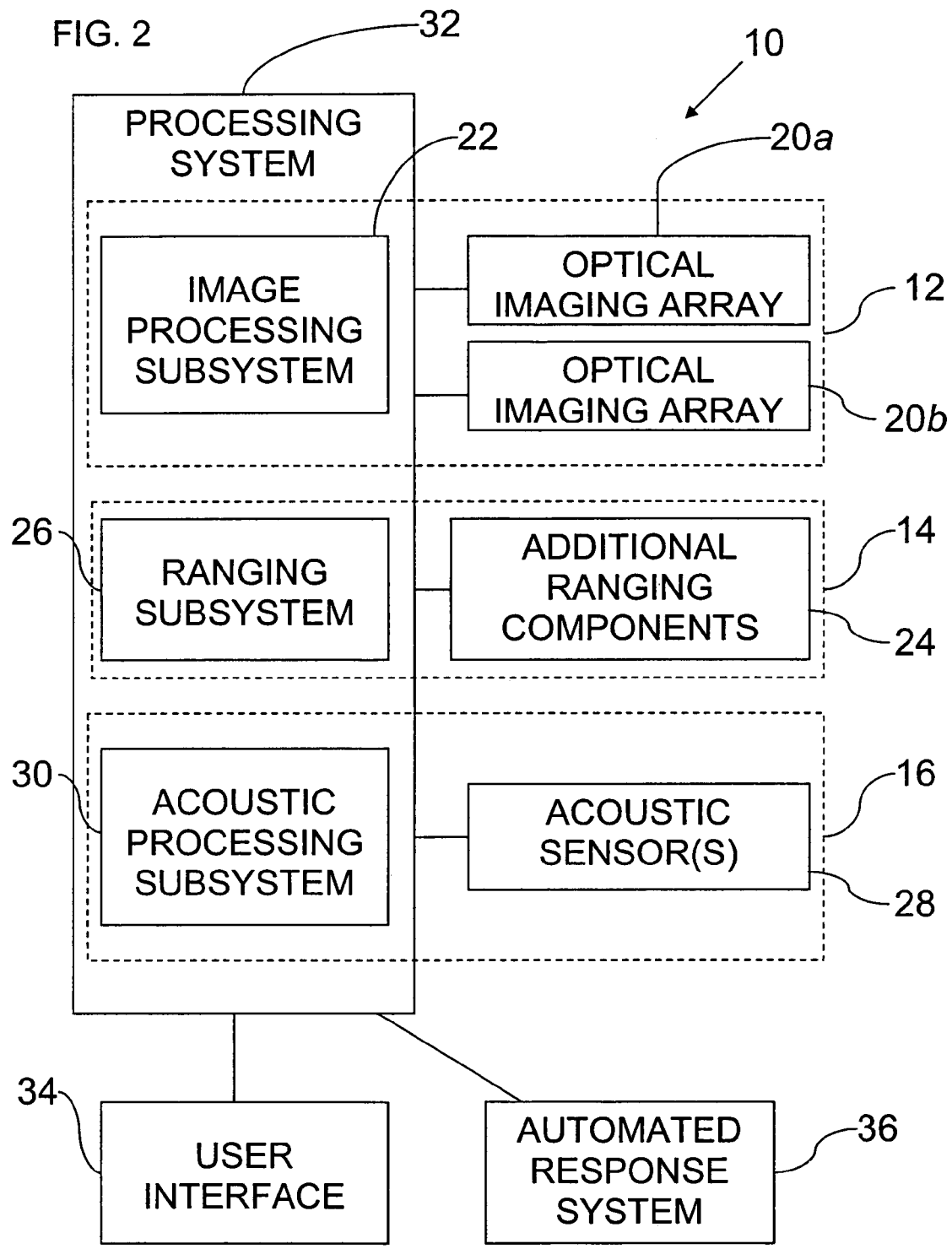
FIG. 2 is a block diagram showing the components of a preferred implementation of the system of FIG. 1.

FIG. 2 shows schematically a preferred structural implementation of these main components. Specifically, optical imaging module 12 includes at least one optical imaging array (e.g. array 20a and array 20b) which passes imaging data to an image processing subsystem 22. The optical imaging array may optionally be a wide angle or panoramic imaging system. Ranging module 14 typically includes additional ranging components designated 24 and a ranging processor subsystem 26. Various specific implementations of ranging module 14 will be discussed below with reference to FIGS. 4A-4C. Acoustic verification module 16 includes at least one acoustic sensor 28 and an acoustic input processing unit 30. Optionally, image processing subsystem 22, ranging processor subsystem 26 and acoustic input processing system 30 may be implemented as parts of a common processing system 32 using either shared or separate processors. The processors may be dedicated hardware, firmware or general purpose processors operating appropriate software under a suitable operating system, all as is well known in the art. Outputs from processing system 32 may pass to a user interface 34 and/or to an automated response system 36 which is configured to take further action such as sending notification to a remote location or actuating a countermeasures system or a counter-fire system.

Figure 3:
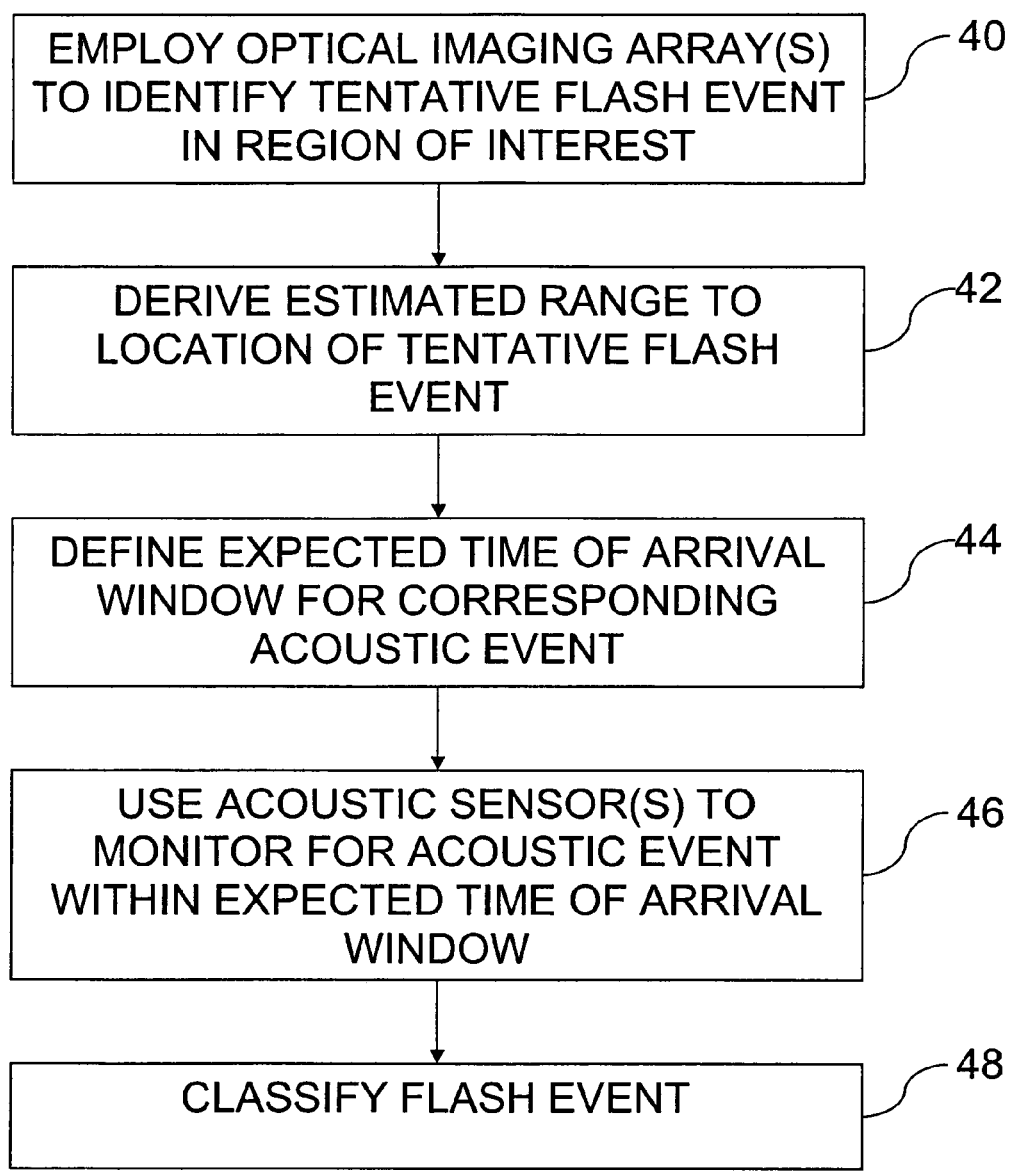
FIG. 3 is a flow diagram illustrating the operation of the system of FIG. 1.

The basic operation of system 10 and the corresponding method according to the teachings of the present invention are illustrated in FIG. 3. Specifically, the method for identifying flash events first employs at least one optical imaging array 20a, 20b to monitor a region of interest to identify a tentative flash event (step 40). Optionally, the tentative flash event may be immediately displayed on user interface 34 or output to automated response system 36 to facilitate preparation for further action subsequent to verification. An estimated range from the system, or more precisely from the acoustic sensor 28, to a location of the tentative flash event is then derived (step 42) and, based upon this estimated range, an expected time of arrival window for an acoustic event corresponding to the tentative flash event is defined (step 44). Acoustic sensor 28 is then used to monitor for an acoustic event corresponding to the tentative flash event within the expected time of arrival window (step 46). If an acoustic event is detected within the expected time of arrival window, the tentative flash event is classified as a verified flash event (step 48). If no corresponding acoustic event is detected, the event is preferably rejected as a false alarm. Alternatively, such a non-verified event may be designated as a questionable flash event for the purposes of processing together with subsequent data or to present to the user as a questionable flash event.

At this point, it will be appreciated that the present invention provides profound advantages over the aforementioned Smith systems. Specifically, by deriving an estimated range based on an event sensed by the optical imaging module, the system predicts the expected time of arrival for the acoustic event so that the arrival or non-arrival of a corresponding acoustic event within the time window provides verification of the nature of the event. This synergy of operation between the optical and acoustic systems is highly effective at discounting false optical flash events (such as sun-glint from moving reflective surfaces) and false acoustic events (such as mechanical impacts and the like), and typically provides a verified output even from a first single shot.

Reference is made herein to "flash events". This term is used herein in the description and claims to refer to events which generate a transient optical flash typically characteristic of firing of a weapon. The "optical flash" may be in visible wavelengths of the electromagnetic spectrum and/or in non-visible wavelengths such as IR and UV. In most preferred implementations, the optical sensor arrays of the present invention are FLIR sensor arrays sensitive particularly in the 2-4 μm range. Suitable sensors are known and commercially available in systems such as the Vectored Infrared Personal Engagement and Return-fire ("VIPER") from the US Naval Research Laboratory.

The present invention relates primarily, although not exclusively, to relatively short-range weapons such as light firearms, rocket-launchers, RPGs and the like, where the firing location is typically sufficiently close to the target location to allow the sound of the firing event to be heard in the proximity of the target location. "Tentative flash events" may include false alarms caused by non-explosive events such as solar reflection from moving reflective objects.

Depending upon the size of the region to be monitored by the optical imaging module, it may be preferable to deploy a plurality of optical imaging arrays to monitor a region greater than a field of view of each individual optical imaging array. At one extreme, particularly for mobile systems, the optical coverage may be panoramic 360° azimuth coverage. For systems located in a fixed location, monitoring of a specific geographic region may allow a relatively small field of view to be used.

Figure 4A:
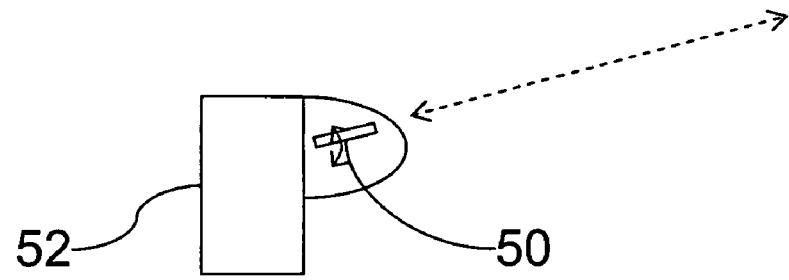
FIGS. 4A-4C are schematic illustrations of three alternative implementations of the ranging module of FIG. 1.
Figure 4B:
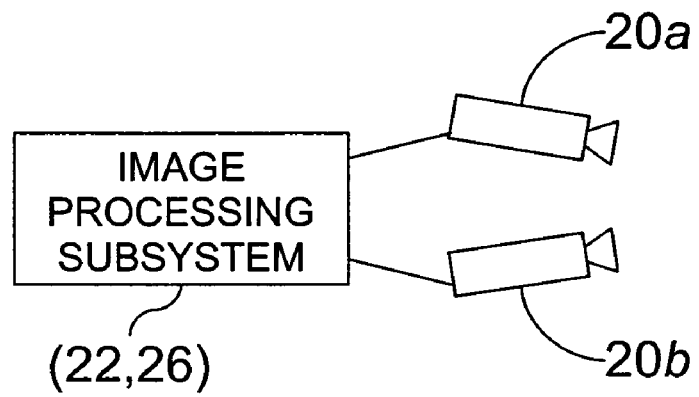
Figure 4C:
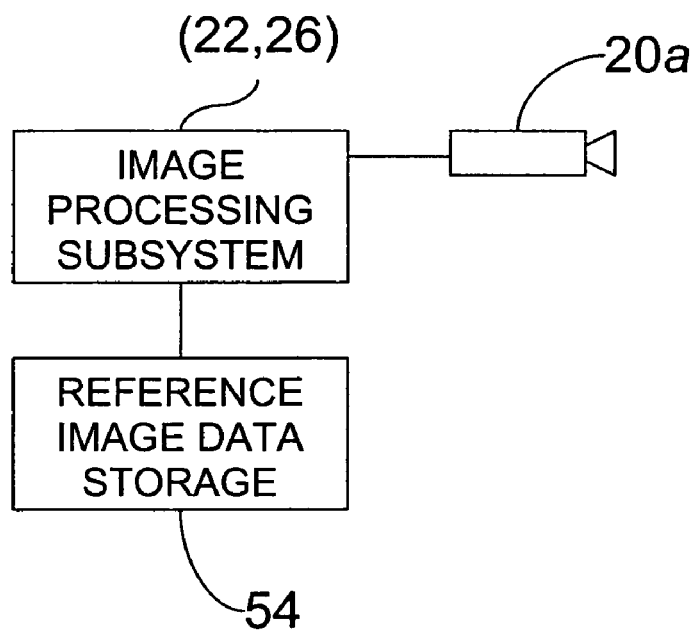

Various preferred options for implementation of the ranging module of the present invention are illustrated schematically in FIGS. 4A-4C. Referring first to FIG. 4A, the ranging module may advantageously be implemented as a gimbaled ranging sensor, including a ranging sensor 50 mounted on a gimbal mechanism 52. Suitable ranging technology includes, but is not limited to, reflected time-of-flight laser measurement. Such sensors have a rapid response time, are low cost and provide good accuracy. In order to provide a sufficiently rapid response to direct the ranging sensor towards the tentative flash event, measure the range and predict the expected time of arrival for the acoustic event prior to the beginning of that window, a high-speed gimbal is required. More preferably, in order to accommodate short-range flash events where the acoustic event follows very quickly after the optical flash, the acoustic signals may be continuously monitored and stored in a data buffer, and the time window may be applied to the stored data. According to a further option, a range map associated with the field of view may be determined offline (i.e., prior to operation) so that each pixel of the image already has range data assigned to it. All of these options are also applicable to other implementations of the ranging sensor such as those described below. In all cases, the system operation is preferably sufficiently fast that the verified flash event information is available to the user substantially immediately (typically less than a second) after the acoustic event time window has finished.

FIG. 4B illustrates an alternative implementation of the ranging module based upon co-processing of overlapping stereoscopic images from optical imaging arrays 20a, 20b of the optical imaging module. In this case, ranging processor subsystem 26 is effectively combined with image processing subsystem 22 and serves to co-process the images from the plurality of optical imaging arrays to derive the estimated range. Suitable processing techniques for correlating and deriving depth information from overlapping views are well known in the art. Depending upon the ranges involved and the precision of range information required, the distance between the imaging sensors typically need not be large. In most cases, a separation of at least a meter between the sensors is sufficient to allow range derivation for the present application.

Finally, turning to FIG. 4C, this shows an implementation of the ranging module similar to that of FIG. 4B but where the stereoscopic image co-processing is performed relative to at least one reference image relating to the region of interest stored in a data storage device 54. The stored reference image may be an optical image taken at an earlier time from a known nearby position, or may be a real or simulated view taken from an airborne or satellite viewpoint. Particularly in this implementation, the image correlation may be performed on a video frame prior or subsequent to the frame containing the "flash" so that it is a better "match" to the reference image.

Once the range of the tentative flash event has been derived, the expected time-of-arrival window is calculated based upon the speed of sound. In an ideal gas, the speed of sound in meters per second is given by about $20 \times \sqrt{T}$ where T is the absolute temperature of the gas. For ambient temperatures in the range of $-40°$ C. and $30°$ C., this corresponds to 300-350 m/s. Optionally, a fixed value of for example 340 m/s may be used for calculations and the time window slightly expanded to allow for temperature variation of the speed of sound. Alternatively, a temperature sensor (or a rough manual setting) may be added and suitable correction included in the calculation. The center of the time window is preferably roughly the range divided by the speed of sound, and the period of the time window should at least cover the margin of error in range estimation, and any approximation made regarding the speed of sound. For most cases, a window of $\pm 10\%$ of the central time value is suitable. Thus, if the estimated range of a tentative flash event is 1,000 meters, using an approximation of 340 m/s for the speed of sound, the center of the estimated time window would be 2.94 seconds, and the $\pm 10\%$ range would be from 2.65 through 3.23 seconds. If temperature correction for the speed of sound is added, a narrower range of $\pm 5\%$ could reasonably be used. In the case that the optical flash signature is indicative of an event with a longer acoustic signature (e.g. firing of a rocket), the start of the acoustic window is calculated as above, but the window is left open for the expected duration of the corresponding acoustic event.

It will be appreciated that the above descriptions are intended only to serve as examples, and that many other embodiments are possible within the scope of the present invention as defined in the appended claims.

What is claimed is:

1. A system for identifying flash events comprising:
   (a) an optical imaging module including at least one optical imaging array, said optical imaging module being configured for monitoring a region of interest to identify a tentative flash event;
   (b) a ranging module associated with said optical imaging module and configured to derive an estimated range to a location of said tentative flash event; and
   (c) an acoustic verification module associated with said ranging module and including at least one acoustic sensor, said acoustic verification module being configured to determine whether an acoustic event corresponding to said tentative flash event is detected within a time window derived from said estimated range, thereby classifying said tentative flash event as either a verified flash event or a rejected flash event.

2. The system of claim 1, wherein said at least one optical imaging array includes a FLIR sensor.

3. The system of claim 1, wherein said optical imaging module includes a plurality of optical imaging arrays deployed to monitor a region greater than a field of view of each individual one of said optical imaging arrays.

4. The system of claim 1, wherein said ranging module includes a gimbaled ranging sensor.

5. The system of claim 1, wherein said optical imaging module includes a plurality of optical imaging arrays with overlapping fields of view, said ranging module including an image processing subsystem for co-processing images from said plurality of optical imaging arrays to derive said estimated range.

6. The system of claim 1, wherein said ranging module includes:
   (a) a data storage device including at least one reference image relating to the region of interest; and
   (b) an image processing subsystem for co-processing an image from said optical imaging array and said at least one reference image to derive said estimated range.

7. A method for identifying flash events comprising the steps of:
   (a) employing at least one optical imaging array to monitor a region of interest to identify a tentative flash event;
   (b) deriving an estimated range to a location of said tentative flash event;
   (c) defining, based upon said estimated range, an expected time of arrival window for an acoustic event corresponding to said tentative flash event;
   (d) using at least one acoustic sensor to monitor for an acoustic event corresponding to said tentative flash event within said expected time of arrival window; and
   (e) if an acoustic event is detected within said expected time of arrival window, classifying said tentative flash event as a verified flash event.

8. The method of claim 7, wherein said at least one optical imaging array includes a FLIR sensor.

9. The method of claim 7, wherein a plurality of optical imaging arrays are employed to monitor a region greater than a field of view of each individual one of said optical imaging arrays.

10. The method of claim 7, wherein said estimated range is derived using a gimbaled ranging sensor.

11. The method of claim 7, wherein said estimated range is derived by stereoscopic image processing of a plurality of images from a plurality of optical imaging arrays with overlapping fields of view.

12. The method of claim 7, wherein said estimated range is derived by co-processing image processing of an image from said optical imaging array with at least one reference image relating to the region of interest.

* * * * *